Jan. 25, 1949. C. E. ALLERTON 2,459,785
LOCKING DEVICE
Filed April 16, 1945

INVENTOR.
CHARLES E. ALLERTON
BY
William D. Hall
ATTORNEY

Patented Jan. 25, 1949

2,459,785

UNITED STATES PATENT OFFICE 2,459,785

LOCKING DEVICE

Charles E. Allerton, Morrisville, Pa.

Application April 16, 1945, Serial No. 588,507

5 Claims. (Cl. 248—161)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to locking devices and more particularly to devices for locking telescopable members at any one of a plurality of positions.

Some locking means for telescopable members means are limited in usefulness because they are only lockable when fully extended. Other locking devices, while being capable of locking the members at various longitudinal positions, either do not lock securely, or deform the parts to such an extent that their useful life is limited, or have external protuberances which are unsightly and inconvenient, or allow the telescoping members to be locked only when said members are in certain rotational positions relative to each other.

It is, therefore, an object of the present invention to provide locking means for telescopable members which securely lock the members irrespective of their relative longitudinal or rotational positions, which will operate well without servicing for a long period of time, and which may be readily and simply repaired.

It is a further object hereof to provide a locking device for telescopable members which will not injure the parts, and which need have no external projections.

Generally, the present invention comprises a pair of telescopable members provided with a tapered recess between the movable parts. In said recess is positioned a tapered slug of friction material. Upon rotating one of the members in one direction, the said slug may be positioned in the wider end of the recess, thereby allowing the telescopable members to move freely relative to each other. However, upon rotating the said member in the opposite direction, the slug may be moved to the narrow end of the recess, whereupon it will frictionally engage the two adjacent surfaces of the telescopable members so as to effect a secure lock therebetween.

For a better understanding of the invention, together with other and further objects thereof, reference is had to the following description taken in connection with the accompanying drawings, wherein like parts are indicated by like reference numerals, and its scope will be pointed out in the accompanying claims.

Figure 1:
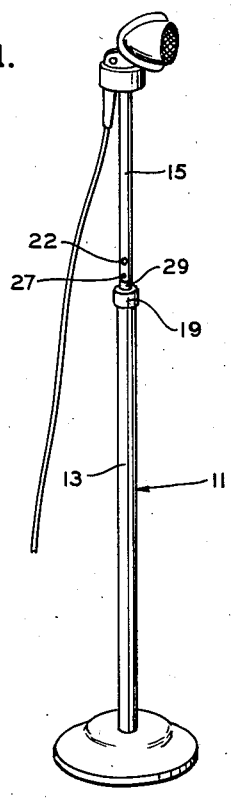
Figure 1 is a perspective view of one embodiment of the present locking device as it might be applied to a microphone pedestal.

Referring now more specifically to the particular embodiment of the present invention which is illustrated in the drawings, the microphone stand 11, shown in Figure 1, includes two vertically disposed coaxial telescopable circular metal tubes 13, 15, the lower tube 13 being of larger diameter than the upper tube 15.

Figure 2:
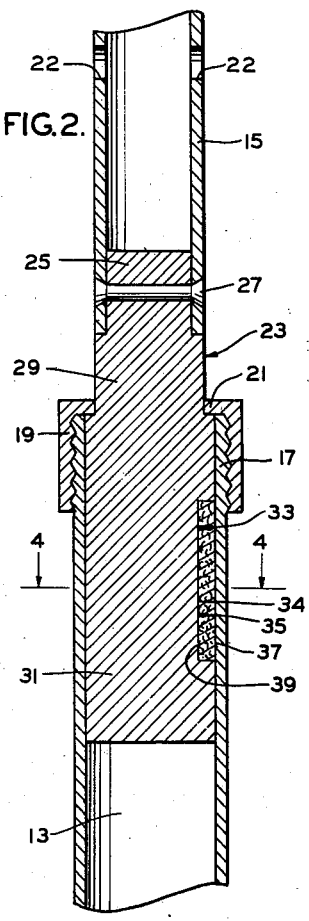
Figure 2 is an enlarged vertical cross section of the locking device of Figure 1, the telescopable members being shown locked in their fully extended positions.
Figure 3:
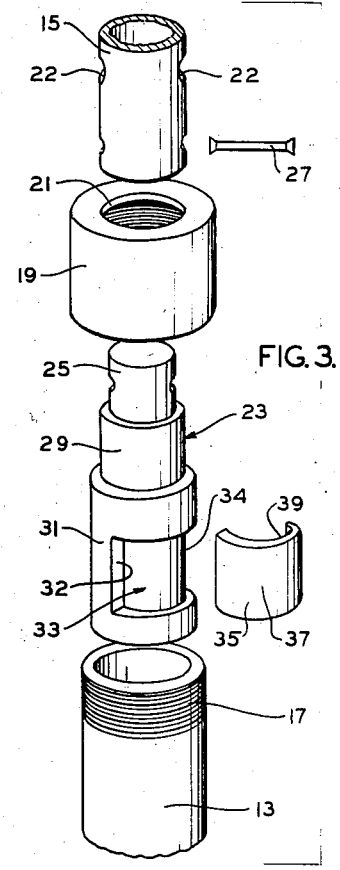
Figure 3 is an exploded perspective view of the locking device of Figure 2.

As may be clearly seen in Figures 2 and 3, the upper end 17 of the larger tube 13 is externally threaded and is fitted with an internally threaded collar 19. The upper end of said collar 19 is provided with an inwardly extending annular flange 21, the inside diameter of which is of a size to make a sliding fit about the smaller tube 15 aforementioned. The smaller telescopable tube 15 may be provided, at any convenient point of its length, with a pair of diametrically opposite holes 22 which are in register.

A plug 23 of solid metal is secured to the lower end of the smaller telescopable tube 15. Said plug 23 comprises a cylindrical shank 25 at its upper end, the outside diameter of which makes a snug force fit inside the lower end of the tube 15 and it is secured therein by any suitable means, such as by the flush rivet 27 which extends through both said tube 15 and said shank 25.

Immediately below the shank 25 the diameter of the plug 23 is increased to form a cylindrical neck 29 which is of the same diameter as the outside of the tube 15. The body portion 31 of the plug 23, below the neck 29, is of further increased diameter so as to make a sliding fit within the lower telescopable tube 13.

Figure 4:
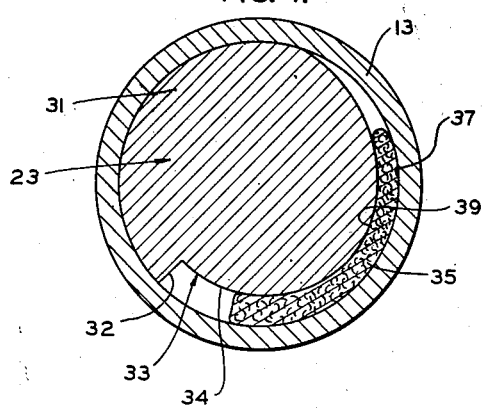
Figure 4 is a further enlarged horizontal cross section, along the line 4—4, of Figure 2, the parts being shown in their locked positions.
Figure 5:
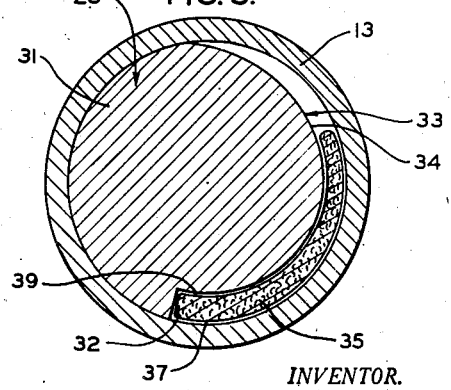
Figure 5 is a cross sectional view similar to Figure 4, the parts being shown in their unlocked positions.

Said body portion 31 is provided with a tapered circumferential recess 33 which may extend any convenient distance around the circumference of the body portion 31. The end of greater depth of said recess 33 terminates in a radially and longitudinally disposed flat surface 32 and the base of said recess forms the curved, cam-like surface 34. The transverse, cross sectional shape of said recess may be clearly seen in Figures 4 and 5, wherein it is shown to extend about approximately two-thirds of the circumference of the body portion 31.

Positioned in said recess 33 is a slug 35 of friction material, such as molded brake-lining. Said slug 35 is in the shape of an arcuate wedge and is provided with an outer curved friction surface 37 and an inner curved friction surface 39.

When assembled, the body portion 31 of the plug 23 and the friction slug 35 are positioned within the larger telescopable tube 13 and the collar 19 is threadably joined to the said tube 13.

In the operation of the embodiment of the present invention just described, the telescopable tubes 13, 15 may be rotated relative to each other. Looking downwardly, as shown in the cross sections of Figures 4 and 5, it will be seen that, if the inner tube 15 is rotated clockwise relative to the outer tube 13, the friction slug 35 will gravitate toward the narrower end of the recess 33 (as in Figure 4) and its outer and inner frictional surface 37, 39 will frictionally engage the interior surface of the tube 13 and the cam-like surface 34 thereby resulting in a locking of the telescopable tubes 13, 15 relative to each other. If, however, the smaller telescopable tube 15 is rotated counterclockwise relative to the tube 13, the friction slug 35 will gravitate toward the wider portion of the recess 33 until it impinges against the surface 32, whereupon the friction slug 35 will be disposed loosely between the inner surface of the tube 13 and the cam-like surface 34 of the plug 23 (as in Figure 5). When so positioned, the inner telescopable tube 15 may be slid longitudinally to any desired position relative to the tube 13. Thus it is seen that the tubes may be locked fully extended (as in Figure 2) or may be locked at any other longitudinal position by merely rotating the tube 15 in a clockwise direction relative to the tube 13.

In ordinary use the friction slug 35 should last indefinitely. However, in the event that it is desired to replace it, it is merely necessary to unscrew the collar 19, whereupon the plug 23 may be removed from the tube 13, thereby exposing the said friction slug 35.

The holes 22 are provided to receive a bar of metal (not shown), in the event that a particularly tight frictional engagement is desired between the parts, as where they are to be locked into position semipermanently. The upper tube 15 is kept from being pulled out of the lower tube 13 by the flange 21.

While there has been described what at present is considered a preferred embodiment of the present invention, it will be obvious to those skilled in the art that various changes and modifications may be made therein without departing from the invention and it is, therefore, aimed in the appended claims to cover such changes and modifications as fall within the true spirit and scope of the invention.

What is claimed is:

1. A locking device for telescopable tubes having cooperating cylindrical bearing surfaces, comprising a tapered circumferential recess between said tubes and extending into only one of said surfaces, said taper extending in a circumferential direction; an arcuate wedge-shaped friction slug disposed in said recess, said slug being wedged tightly between the base of said recess and one of said bearing surfaces when the tubes are in locked condition.

2. A locking device for telescopable tubes comprising a plug secured to one end of the narrower tube, a substantially cylindrical bearing surface on said plug adapted to slidably fit the inside of the wider telescopable tube, a tapered recess extending circumferentially about said plug, an arcuate wedge-shaped friction slug disposed in said recess and stop means to keep said plug from sliding out of said wider tube.

3. A locking device for telescopable members comprising a substantially cylindrical external bearing surface on the member of lesser diameter, a substantially cylindrical internal bearing surface on the member of greater diameter slidably cooperable with the said external bearing surface, a tapered recess extending circumferentially about said member of lesser diameter, an arcuate wedge-shaped friction slug, of lesser circumferential dimension than the said recess, disposed in said recess, the radial dimensions of the slug and recess being such that when the slug is adjacent the deeper end of the recess the two bearing surfaces may be readily moved relative to each other and when the slug is adjacent the shallower end of the recess it frictionally grips both the circumferential surface of said recess and the internal bearing surface aforementioned so as to maintain the members in fixed relative positions and stop means to keep said member of lesser diameter from separating from said member of greater diameter.

4. A locking device for a member having a cavity and a second member having an exterior portion slidable in said cavity, comprising interior and exterior substantially cylindrical cooperating bearing surfaces in said cavity and on said exterior portion respectively, a tapered recess extending circumferentially about said exterior portion and an arcuate wedge-shaped friction slug, of lesser circumferential dimension than said recess, disposed in said recess; the radial dimensions of the slug relative to those of the recess and the diameters of the interior and exterior bearing surfaces being such that when the slug is positioned in a deep portion of the recess the members may be readily moved relative to each other and when the slug is positioned in a shallow portion of the recess it is wedged between the base of the recess and the interior bearing surface so as to lock the members against relative movement.

5. In a locking device for telescopable members, cylindrical bearing surfaces on the two members in slidable engagement with each other, a tapered recess extending circumferentially about the bearing surface of the inner member and an arcuate wedge-shaped friction slug disposed in said recess, the recess being of greater circumferential dimension than the slug, and the slug, when the members are in locked position, being wedged tightly between the base of the recess and the bearing surface of the outer member.

CHARLES E. ALLERTON.

REFERENCES CITED

The following references are of record in the file of this patent:

UNITED STATES PATENTS

| Number | Name | Date |
|---|---|---|
| 641,106 | Hawksworth | Jan. 9, 1900 |
| 683,656 | Moyle | Oct. 1, 1901 |
| 1,557,923 | Carroll | Oct. 25, 1925 |
| 1,970,624 | Recker | Aug. 21, 1934 |
| 2,090,550 | Pilblad | Aug. 17, 1937 |
| 2,337,719 | Hueglin | Dec. 28, 1943 |
| 2,376,716 | Odin | May 22, 1945 |

FOREIGN PATENTS

| Number | Country | Date |
|---|---|---|
| 451,680 | Great Britain | Aug. 10, 1936 |